Oct. 26, 1943.  R. W. JOHNSON  2,332,852
FASTENER AND FASTENER INSTALLATION
Filed Dec. 12, 1940
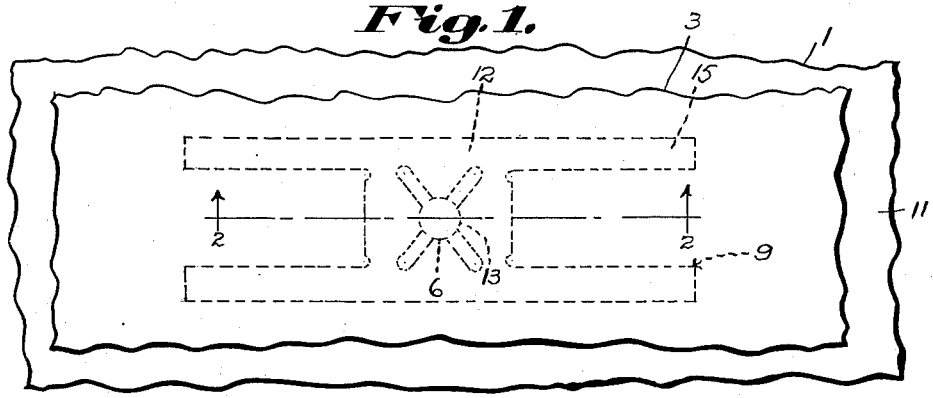
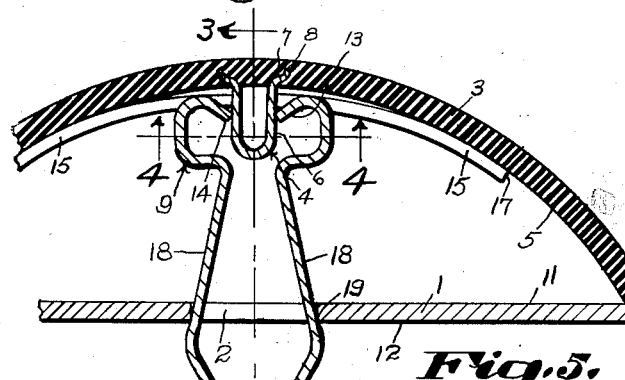
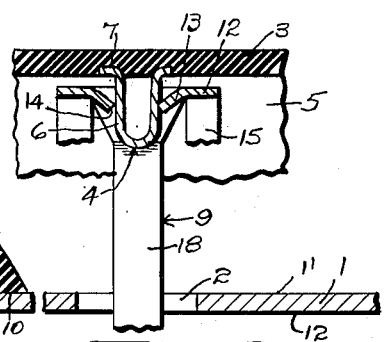
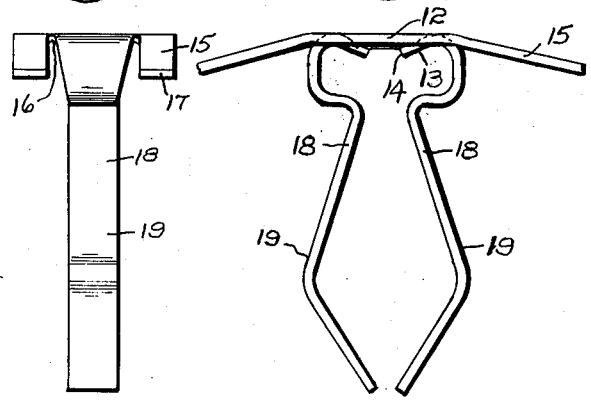
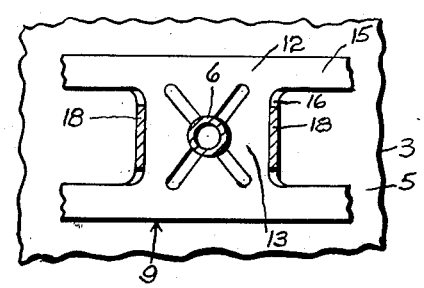
Inventor:
Russell W. Johnson.
By John Todd
Att'y.

Patented Oct. 26, 1943

2,332,852

UNITED STATES PATENT OFFICE 2,332,852

FASTENER AND FASTENER INSTALLATION

Russell W. Johnson, Detroit, Mich., assignor to United-Carr Fastener Corporation, Cambridge, Mass., a corporation of Massachusetts Application December 12, 1940, Serial No. 369,845

4 Claims. (Cl. 189—88)

This invention relates to fastener members and fastener installations and is directed particularly to a fastening in which a trim strip of phrenolic condensate material is secured to a metal supporting panel.

One of the objects of my invention is the provision of a fastener member having means for engagement with a stud projecting from the inner surface of a trim strip so as to be secured in fixed assembly with the trim strip and also providing means to effect snap fastener engagement with a supporting panel through an aperture thereof to secure the strip firmly to the panel.

Another object of my invention is directed to the particular construction of the fastener wherein it provides yieldable arms engaging the inner surface of the trim strip enabling the fastener to be maintained in fixed non-movable relation to the strip.

Other objects and uses of my invention will be apparent from inspection of the drawing and specification hereinbelow set forth.

Referring to the drawing, in which I have illustrated a preferred embodiment of my invention:

Fig. 1 is a top plan view of my preferred fastener installation including a supporting part and a trim strip secured to the supporting part by means of my improved fastener member;

Fig. 2 is a fragmentary sectional view taken along the line 2—2 of Fig. 1;

Fig. 3 is a section taken along the line 3—3 of Fig. 2;

Fig. 4 is a section taken along the line 4—4 of Fig. 2;

Fig. 5 is an edge elevation of my improved fastener member per se; and

Fig. 6 is a side elevation of the fastener member shown in Fig. 5.

Referring to a preferred installation of my invention illustrated in Figs. 1-4, I have provided a flat supporting panel 1, which is preferably metal, having an opening 2 therein which is preferably rectangular in shape. The supporting part 3, which I have chosen for purposes of illustration, is in the form of a strip of insulating material which is curved in transverse cross-section, as most clearly shown in Fig. 2. A projection or stud 4 extends from the inner surface 5 of the strip for a purpose to be described. The stud 4 comprises a shank 6, which may be hollow or solid, and a base 7 having prongs 8 molded within the strip 3 to secure the stud in firm attachment to the strip. The strip 3 is secured to the support 1 by means of my improved fastener member 9 having spring elements engageable with the shank 6 of the stud to secure the fastener in assembly with the strip 3 and support-engaging portions adapted to be snapped through the opening 2 of the support and engage behind material of the support adjacent the opening.

It will be noticed that in my preferred installation the longitudinal edges 10 of the strip 3 abut the upper surface 11 of the support 1 (Fig. 2). Thus I have shown the use of my fastener member in a simple trim installation wherein it is desired for purposes of ornamentation to secure a trim strip in abutting relation to the same supporting panel through which the fastener is snapped. It should be understood, however, that my fastener is equally adaptable to use with other installations, as, for example, where it is desired to secure a breaker strip between the inner and outer spaced walls of a refrigerator compartment. In such an installation the inner and outer walls of the compartment have inturned flanges adjacent the door opening and spaced for their entire lengths and a strip of Bakelite or other suitable insulating material, such as the strip 3 of the drawing, is applied to the flanges so that the longitudinal edges of the strip abut the outer surfaces of the flanges and the strip covers completely the space between the walls. In an installation of this sort the supporting panel is secured in insulated relation to the inner surfaces of the flanges and positioned in a way to bridge the flanges. The strip 3, when used in the aforesaid refrigerator installation, is visible when the compartment door is open and therefore it is desirable that it have a smooth and unmarked outer surface so as to enhance the appearance of the cabinet.

Referring in detail to my improved fastener member 9, I have shown one formed entirely from a single piece of spring metal. The fastener provides a head portion 12 which is relatively flat having an opening for receiving the shank 6 of the stud 4 and a series of yieldable finger elements 13 bent from the plane of the head. The elements 13 have pointed free ends 14 adjacent the stud-receiving opening and adapted to bite into the shank when the same is forced through the opening. A pair of yieldable arms 15 extend laterally from opposite side edges 16 (Fig. 4) of the head. The arms of each pair are disposed in substantially the same plane and in spaced relation. The free ends 17 of the arms are, in normal position of the arms, preferably disposed slightly beneath the plane of the head 12, viewing Figs. 5 and 6. The fastener provides a support-engaging shank comprising a pair of opposed yieldable legs 18—18 integrally joined to opposite edges 16 of the head 12 between respective pairs of arms 15. Portions of the legs diverge in a direction away from the head 12 and then converge to their free ends forming shoulders 19—19.

Assembly of the parts of the installation is preferably carried out through first securing the fastener member 9 in assembly with the supporting strip 3. This is accomplished by moving the head of the fastener toward the stud 4 to force the shank 6 between the finger elements 13. The finger elements are expanded by this action and their free ends 14 bite into the shank of the stud under the adherent tension of the elements so as to resist any force tending to pull the fastener off the pin. During the operation by which the finger elements are engaged with the stud, the spring arms 15 engage the inner surface 5 of the strip and the free ends 17 of the arms are bent downwardly to an increased degree, as most clearly shown in Fig. 2, so as to resiliently engage the inner surface. Resilient engagement of the arms 15 with the strip tends to balance the fastener so as to prevent relative rocking between the fastener head and stud when the legs are snapped into engagement with the support. Also, the ends 17 of the arms engage the inner surface 5 of the strip under sufficient tension to resist the tendency of the fastener to rotate on the stud.

The fastener member is now securely assembled with the strip 3 and the strip is ready for application to the panel 1. This is accomplished by moving the strip toward the panel to project the legs 18—18 through the aperture 2. Movement of the legs 18 through the aperture is continued until the free edges 10 of the strip 3 abut the outer surface 11 of the support. At this time the shoulders 19 have passed through the aperture and the legs 18, which were contracted by movement thereof through the aperture, expand to engage the shoulders 19 behind the lower surface 12 of the support, as most clearly shown in Fig. 2.

Thus it will be seen that by my invention I have provided a fastener of simple and inexpensive construction capable of assembly with a part to be supported so as to be positioned entirely on the inner side thereof thereby leaving the outer side of the part smooth and unmarked. At the same time, the fastener is capable of snap fastener engagement with a support to secure the strip in firm engagement therewith.

Although I have illustrated and described a preferred embodiment of my invention, I do not wish to be limited thereby because the scope of my invention is best defined by the following claims.

I claim:

1. A fastener assembly comprising, in combination, a support having an aperture, a part to be supported having a stud projecting from the inner surface thereof at a point spaced outwardly from the support, and a fastener member securing said supported part to said support, said fastener having a head located in outwardly spaced relation from the support, stud-engaging means integral with said head and in fastener engagement with said stud to secure said fastener to said supported part, arms extending on opposed sides of said head and resiliently engaging said inner surface of said supported part spaced outwardly from the support to maintain said fastener against rocking movement and rotation relative to the stud, and a shank extending on one side of said head comprising a pair of opposed yieldable legs, said legs being shouldered intermediate their ends for snap fastener engagement with said support through said aperture thereof.

2. A fastener assembly comprising, in combination, a support having an aperture, a strip to be secured to said support, said strip being curved in transverse cross-section and having a stud projecting from the inner surface thereof at a point spaced outwardly from the strip, and a fastener member securing said strip to said support, said fastener having a head located in outwardly spaced relation from the support, stud-engaging means integral with said head and in fastener engagement with said stud to secure said fastener to said strip, a pair of spaced spring arms integral with and extending from opposite edges of said head, said arms resiliently engaging said inner surface of said surface of said strip in spaced relation to said support to prevent relative rocking movement and rotation of the fastener member relative to the stud, and a pair of opposed yieldable legs joined to the sides of said head between said respective pairs of arms, said legs being shouldered intermediate their ends for snap fastener engagement with said support through said aperture thereof.

3. A fastener member for securing a stud-carrying part to be secured to an apertured support, said fastener member comprising a substantially flat head, a stud-receiving opening in said head, stud-engaging means integral with the head adjacent said stud-receiving opening, arms integral with and projecting laterally from the head on opposite sides of said opening adapted to engage the inner surface of the part to be secured to maintain the fastener member against rocking movement and rotation relative to the stud independently of connection of the fastener member with the support, and a shank for securing connection between the fastener member and the support comprising a pair of resilient legs projecting in spaced relation to each other from one side of the head, said legs having portions thereof adjacent the head bent inwardly towards each other and forming a reduced shank neck portion and having further portions beyond said reduced neck portion bent to form shoulders for snap fastener engagement with the support through an aperture therein.

4. A fastener member for securing a stud-carrying part to be secured to an apertured support, said fastener member comprising a substantially flat head, a stud-receiving opening in said head, stud-engaging means integral with the head adjacent said stud receiving opening, a pair of spaced yieldable arms integral with and extending laterally from each of opposite sides of the head and adapted to engage the inner surface of the part to be secured to maintain the fastener member against rocking movement and rotation relative to the stud independently of any connection between the fastener member and the support, and a shank for securing connection between the fastener member and the support comprising a pair of resilient legs projecting in spaced relation to each other from one side of the head, said legs having portions thereof adjacent the head bent inwardly towards each other and forming a reduced shank neck portion and having further portions beyond said reduced neck portion bent to form shoulders for snap fastener engagement with the support through an aperture therein.

RUSSELL W. JOHNSON.